United States Patent [19]

Frischinger et al.

[11] Patent Number: 6,090,891
[45] Date of Patent: Jul. 18, 2000

[54] CARBOXYL-CONTAINING POLYMER(S) WITH (2-OXO-1,3-DIOXOLAN-4-YL)METHYL GROUPS-CONTAINING COMPOUND(S)

[75] Inventors: Isabelle Frischinger, Riespach, France; Jacques-Alain Cotting, Bonnefontaine, Switzerland; Jürgen Finter, Freiburg, Germany; Jacques François, Huningue, France

[73] Assignee: Ciba Specialty Chemicals Corp., Tarrytown, N.Y.

[21] Appl. No.: 09/075,639

[22] Filed: May 11, 1998

[30] Foreign Application Priority Data

May 30, 1997 [CH] Switzerland ............... 97-1276

[51] Int. Cl.⁷ ............... C08L 33/02; C08L 63/00; C08L 67/04; C08L 69/00
[52] U.S. Cl. ............... 525/111; 525/114; 525/166; 525/176; 525/186; 525/439
[58] Field of Search ............... 525/439, 111, 525/114, 166, 176, 186

[56] References Cited

U.S. PATENT DOCUMENTS

| | | |
|---|---|---|
| 2,915,529 | 12/1959 | Bell, Jr. et al. |
| 3,578,623 | 5/1971 | Weissermel et al. |
| 4,374,961 | 2/1983 | Kudo et al. ............... 525/439 |
| 4,835,289 | 5/1989 | Brindopke ............... 549/229 |
| 5,847,027 | 12/1998 | Marten et al. ............... 523/404 |
| 5,853,809 | 12/1998 | Campbell et al. ............... 427/407.1 |

FOREIGN PATENT DOCUMENTS

| | | |
|---|---|---|
| 697440 | 2/1996 | European Pat. Off. |
| 48-41713 | 12/1973 | Japan . |
| 49-5917 | 2/1974 | Japan . |
| 59-116413 | 7/1984 | Japan . |
| 4-149275 | 5/1992 | Japan . |
| 4-161465 | 6/1992 | Japan . |

*Primary Examiner*—Robert E. Sellers
*Attorney, Agent, or Firm*—Michael A. Kovaleski

[57] ABSTRACT

Curable compositions, which comprise the following components:
(A) a polymer component consisting of one or more than one of the following components:
polymers based on acrylate monomers and/or methacrylate monomers containing free carboxyl groups, and carboxyl-terminated polyesters;
(B) a crosslinker for component (A) selected from the group consisting of:
(B1) one or more than one compound having a molecular weight of less than 800 and containing at least two (2-oxo-1,3-dioxolan-4-yl)methyl groups per molecule, and
(B2) a mixture consisting of one or more than one compound having a molecular weight of less than 800 and containing at least two (2-oxo-1,3-dioxolan-4-yl)methyl groups per molecule, and of one or more than one epoxy resin, at least 60 percent of the total number of (2-oxo-1,3-dioxolan-4-yl)methyl groups and epoxy groups of the mixture being (2-oxo-1,3-dioxolan-4-yl)methyl groups;
(C) a catalyst for accelerating the crosslinking reaction between the components (A) and (B), and
(D) a solvent for the components (A), (B) and (C);
the molar ratio of free carboxyl groups to the total number of (2-oxo-1,3-dioxolan-4-yl)methyl groups and epoxy groups in the composition being from 0.3:1 to 3:1,
have particularly good storage stability and are therefore suitable for use in one-component form, for example as coating agents.

11 Claims, No Drawings

CARBOXYL-CONTAINING POLYMER(S) WITH (2-OXO-1,3-DIOXOLAN-4-YL)METHYL GROUPS-CONTAINING COMPOUND(S)

The present invention relates to a curable composition based on (A) polymers containing free carboxyl groups and (B) a crosslinker for component (A) as well as to a process for coating objects using such a composition. One such composition has already been described in EP-A-0 697 440. That composition comprises as component (A) a mixture consisting of (A1) at least one polymer based on acrylate monomers and/or methacrylate monomers, which contains an average of 0.1 to 4.0 equivalents of free carboxyl groups per kilogram of polymer, and of (A2) at least one carboxyl-terminated polyester, which contains an average of 0.2 to 6 equivalents of free carboxyl groups per kilogram of polyester, component (A1) constituting 50 to 90 percent by weight and component (A2) making up the remainder of component (A). The crosslinker (B) for component (A) in said composition comprises one or more than one epoxy resin having two or more than two epoxy groups per molecule, selected from glycidyl esters of cyclic carboxylic acids, glycidyl ethers of trimethylolpropane, glycidyl ethers of bis(dimethylolpropyl) ether as well as reaction products of glycidyl ether derivatives of trimethylolpropane or bis (dimethylolpropyl) ether with aliphatic or cycloaliphatic polyisocyanate mono- or oligomers, the molar ratio of free carboxyl groups to epoxy groups in the composition being from 0.3 to 3. The compositions also comprise (C) a catalyst for accelerating the crosslinking reaction between component (A) and component (B) of the composition and also (D) an inert solvent. The cited compositions have, inter alia, good processing properties and give coatings having good fastness properties. However, these compositions have the disadvantage of being only little storage-stable even at moderate temperatures and can thus be used in practice only as two-component compositions.

JP-A-Hei 4-161465 describes solvent-free curable compositions (powder coatings) which comprise a vinyl polymer containing at least two 2-oxo-1,3-dioxolan-4-yl groups, a compound containing free carboxyl groups, e.g. a carboxyl-terminated polyester resin, and a catalyst for accelerating the crosslinking reaction of the components of the composition. The compositions can be cured at low temperatures and are described as being particularly storage-stable and can be used, for example, as one-component coatings. According to that publication, the vinyl polymer containing 2-oxo-1,3-dioxolan-4-yl groups has a molecular weight (number average) of at least 800, as no compositions having good performance properties are otherwise obtained.

Surprisingly, it has now been found that it is possible to obtain curable compositions based on (A) polymers containing free carboxyl groups and on (B) a crosslinker for component (A), which compositions also have very good properties if the crosslinker used is a compound having a molecular weight of less than 800 and containing at least two (2-oxo-1,3-dioxolan-4-yl) methyl groups per molecule.

This invention relates to a curable composition, which comprises the following components:

(A) a polymer component consisting of one or more than one of the following components:
polymers based on acrylate monomers and/or methacrylate monomers containing free carboxyl groups, and carboxyl-terminated polyesters;

(B) a crosslinker for component (A) selected from the group consisting of:
(B1) one or more than one compound having a molecular weight of less than 800 and containing at least two (2-oxo-1,3-dioxolan-4-yl)methyl groups per molecule, and
(B2) a mixture consisting of one or more than one compound having a molecular weight of less than 800 and containing at least two (2-oxo-1,3-dioxolan-4-yl) methyl groups per molecule, and of one or more than one epoxy resin, at least 60 percent of the total number of (2-oxo-1,3-dioxolan-4-yl)methyl groups and epoxy groups of the mixture being (2-oxo-1,3-dioxolan-4-yl)methyl groups;

(C) a catalyst for accelerating the crosslinking reaction between the components (A) and (B), and (D) a solvent for the components (A), (B) and (C);

the molar ratio of free carboxyl groups to the total number of (2-oxo-1,3-dioxolan-4-yl)methyl groups and epoxy groups in the composition being from 0.3 to 3:1

The poly[(2-oxo-1,3-dioxolan-4-yl)methyl] compounds used according to this invention as crosslinkers preferably have the formula (I):

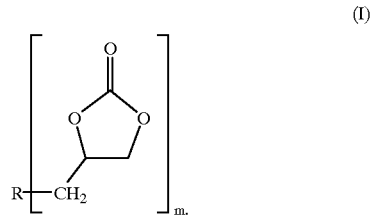

In formula (I), R is a group of formula (II):

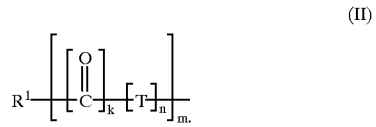

The indices k and n are each independently of the other 0 or 1; m is 2 or an integer higher than 2, and T in each of the m groups of formula

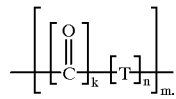

corresponds independently of each other to a group of formula —O—, —NH— or —N<, and $R^1$ is an m-valent organic radical which has a molecular weight of 28 to 800 minus m.$(101+28.k+MG_T.n)$, preferably of 28 to 600 minus m.$(101+28.k+MG_T.n)$, $MG_T$ corresponding to the average molecular weight of the groups T. $R^1$ can encompass, in particular, carbon atoms and hydrogen atoms and optionally also oxygen atoms and/or nitrogen atoms.

Preferred examples of poly[(2-oxo-1,3-dioxolan-4-yl) methyl] compounds which are suitable as crosslinkers for the novel compositions are, inter alia, (2-oxo-1,3-dioxolan-4-yl)methyl esters of straight-chain or branched as well as of cyclic polycarboxylic acids, typically of aliphatic dicarboxylic acids, in particular of aliphatic $C_3$–$C_2$ dicarboxylic acids, such as of malonic acid, succinic acid, glutaric acid, adipic acid, pimelic acid or sebacic acid. In this application, (2-oxo-1,3-dioxolan-4-yl)methyl esters of cyclic polycarboxylic acids will be understood as being poly[(2-oxo-1,3- dioxolan-4-yl)]methyl esters of carboxylic acids containing at least two carboxyl groups, the molecule of which comprises at least one ring system, preferably of 5 to 14 ring carbon atoms. The carboxyl groups can in this case be bound direct to an atom of a ring system, e.g. in the case of polycarboxylic acid derivatives of benzene or naphthalene. However, the carboxyl groups can be bound just as well to atoms of non-cyclic structural elements of the carboxylic acid molecule, e.g. in the case of o-, m- or p-phenylenediacetic acid. Suitable carboxylic acids can contain only one ring system or also two or more than two ring systems in their molecule, which systems are fused or linked via suitable atom groups, for example via a group of one of the following formulae:

$$-CH_2-\, ;\ -C(CH_3)_2-\, ,\ -O-$$

or

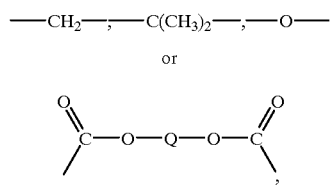

wherein Q is a 2-valent organic radical containing 2 to 15 carbon atoms. Illustrative examples of suitable poly[(2-oxo-1,3-dioxolan-4-yl)methyl] esters of cyclic polycarboxylic acids according to this invention include the corresponding esters of dicarboxylic acids, typically of phthalic acid, isophthalic acid, terephthalic acid, 2,5-dimethylphthalic acid, of naphthalene-2,6-dicarboxylic acid, naphthalene-1,8-dicarboxylic acid, naphthalene-2,3-dicarboxylic acid, of diphenyl ether-4,4'-dicarboxylic acid, diphenyl-2,2'-dicarboxylic acid, of tetrachlorophthalic acid, 2,5-dichlorophthalic acid, of tetrahydrophthalic acid, methyltetrahydrophthalic acid, hexahydrophthalic acid, methylhexahydrophthalic acid, of endomethylenehexahydrophthalic acid, hexahydroterephthalic acid, hexahydroisophthalic acid, thiophene-2,5-dicarboxylic acid, furan-2,5-dicarboxylic acid, furan-3,4-dicarboxylic acid, pyrazine-3,4-dicarboxylic acid, or of higher-functional carboxylic acids, such as of 1,2,3-benzenetricarboxylic acid (hemimellitic acid), 1,2,4-benzenetricarboxylic acid (trimellitic acid), 1,3,5-benzenetricarboxylic acid (trimesic acid), 1,2,3,4-benzenetetracarboxylic acid (mellophanic acid), 1,2,4,5-benzenetetracarboxylic carboxylic acid (pyromellitic acid), 1,2,3,5-benzenetetracarboxylic acid, benzenepentacarboxylic acid and benzenehexacarboxylic acid (mellitic acid), naphthalenetetracarboxylic acid, perylenetetracarboxylic acid or of tetracarboxylic acids of the following formula:

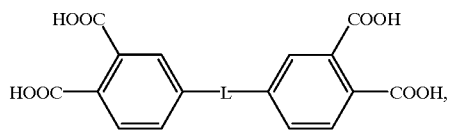

wherein L is $-CH_2-$, $-C(CH_3)_2-$ or $-O-$, in particular of benzophenone-3,3',4,4'-tetracarboxylic acid, and also of derivatives of the cited acids containing partially or completely hydrated carbon rings.

The preferred suitable poly[(2-oxo-1,3-dioxolan-4-yl)methyl] compounds according to this invention also include the corresponding ethers, i.e. compounds of the above formula (I), wherein R is a radical of formula (II), wherein k is 0 and n is 1 and wherein $R^1$ is a straight-chain or branched or cyclic m-valent organic group. In analogy to the above definition of cyclic polycarboxylic acids, the term "cyclic group" will be understood as meaning all those groups which contain at least one ring system. The preferred examples of poly[(2-oxo-1,3-dioxolan 4-yl)methyl] ethers which are suitable as crosslinkers for the novel compositions include 1,4-bis(2-oxo-1,3-dioxolan-4-yloxy)butane, 2,2-bis(2-oxo-1,3-dioxolan-4-yloxyme-thyl)-1-(2-oxo-1,3-dioxolan-4-yloxy)butane, 1-[2,2-bis(2-oxo-1,3-dioxolan-4-yloxymethyl butoxy]-2-(hydroxymethyl)-2-(2-oxo-1,3-dioxolan-4yloxymethyl)butane and bis(2-oxo-1,3-dioxolan-4-yloxymethyl)cyclohexane.

Poly[(2-oxo-1,3-dioxolan-4-yl)methyl] compounds, such as those cited above, can be prepared by customary methods known to the skilled person, for example according to U.S. Pat. No. 4,835,289 by heating the corresponding polyglycidyl compound under a stream of carbon dioxide gas at normal pressure in the presence of a suitable catalyst, such as potassium iodide or tetrabutylammonium iodide, to a temperature in the range from about 130 to 150° C. Where appropriate, it is also possible to work not under normal but at elevated pressure sure, e.g. under a $CO_2$-pressure of 0.1 to 1 MPa. The described reaction proceeds according to the following scheme, wherein m and R have the meaning already stated above:

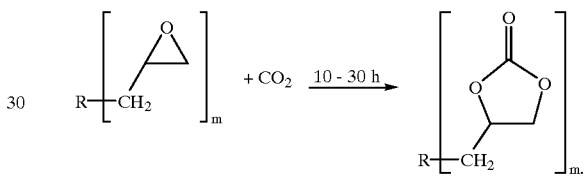

Particularly preferred compositions according to this invention are characterised in that the compound of formula (I) is a compound selected from:
(2-oxo-1,3-dioxolan-4-yl)methyl esters of aliphatic dicarboxylic acids containing 4 to 8 carbon atoms,
(2-oxo-1,3-dioxolan-4-yl)methyl esters of benzenedi- or benzenetricarboxylic acids,
(2-oxo-1,3-dioxolan-4-yl)methyl esters of cyclohexanedi- and cyclohexanetricarboxylic acids;
1,4-bis(2-oxo-1,3-dioxolan-4-yloxy)butane,
2,2-bis(2-oxo-1,3-dioxolan-4-yloxymethyl)-1-(2-oxo-1,3-dioxolan-4-yloxy)butane,
1-[2,2-bis(2-oxo-1,3-dioxolan-4-yloxymethyl)butoxy]-2-(hydroxymethyl)-2-(2-oxo-1,3-dioxolan-4-yloxymethyl) butane, and
bis{[(2-oxo-1,3-dioxolan-4-yl)methyl]oxymethyl}cyclohexane.

If the crosslinker for component (A) in this composition is a mixture (B2) consisting of one or more than one compound having a molecular weight of less than 800 and containing at least two (2-oxo-1,3-dioxolan-4-yl)methyl groups per molecule, and of one or more than one epoxy resin, then—although the choice of the epoxy resin is not critical and may in principle be arbitrary so long as it is soluble in the amount used in the solvent (D)—the epoxy resin is preferably the epoxy component corresponding to the poly[(2-oxo-1,3-dioxolan-4-yl)methyl] component used, i.e. that epoxy resin component from which the poly[(2-oxo-1,3-dioxolan-4-yl) methyl] component can be obtained according to the reaction scheme described above.

The use of a mixture (B2) as crosslinker can be particularly advantageous whenever it is necessary to specifically adjust the reactivity of the novel compositions.

The polymer component (A) consists of one or more than one of the following components:

polymers containing free carboxyl groups which are based on acrylate monomers and/or methacrylate monomers and carboxyl-terminated polyesters.

The polymers containing free carboxyl groups and based on acrylate monomers and/or methacrylate monomers are preferably copolymers of one or more than one acrylic acid esters and/or methacrylic acid esters, preferably of the corresponding alkyl esters containing 1 to 8 carbon atoms in the alkyl group, with acrylic acid and/or methacrylic acid and optionally further ethylenically unsaturated comonomers. The copolymers preferably have a molecular weight (weight average Mw) of 1,000 to 30,000. Their glass transition temperature is usefully above 20° C. and, preferably, above 30° C. Typical examples of suitable (meth) acrylic acid ester monomers are ethyl acrylate, butyl acrylate, 2-ethylhexyl acrylate and, in particular, $C_1$–$C_4$alkylmethacrylates, such as methyl methacrylate, ethyl methacrylate or butyl methacrylate. (Meth)acrylate derivatives containing silane groups can also be used. Suitable ethylenically unsaturated comonomers are, for example, acrylamines and acrylo- or methacrylonitriles and also vinyl compounds. Preferred comonomers are vinyl aromatic compounds, in particular styrene. A very particularly preferred copolymer is that of methacrylic acid, methacrylic acid-$C_1$–$C_4$alkyl esters and styrene. The above polymers can be prepared in known manner, for example by polymerisation of the monomers which are dissolved in suitable organic solvents, in particular in toluene or in mixtures of 1-methoxy-2-propanol, 1-methoxy-2-propylacetate and methyl isobutyl ketone (e.g. at a weight ratio of 70/20/10) in the presence of a suitable initiator, such as dicumyl peroxide, and of a chain transfer reagent, such as thioglycolic acid.

The carboxyl-terminated polyesters for polymer component (A) usefully have a molecular weight (weight average Mw) of 500 to 5,000, preferably of up to 3,000, more preferably of up to 2,000. The polyesters are preferably flowable at room temperature and their glass transition temperature is therefore preferably below 30° C.

The polymer component (A) is particularly preferably a mixture consisting of:

(A1) at least one polymer based on acrylate monomers and/or methacrylate monomers and containing an average of 0.1 to 4.0 equivalents of free carboxyl groups per kilogram of polymer, and (A2) at least one carboxyl-terminated polyester containing an average of 0.2 to 6 equivalents of free carboxyl groups per kilogram of polyester.

Component (A1) usefully constitutes 50 to 90 percent by weight and component (A2) makes up the remainder of polymer component (A).

Particularly preferred polyesters for the polymer component (A) are semiesters of an aliphatic or cycloaliphatic 1,2-dicarboxylic acid and of a polyester polyol or a polylactone polyol, each having at least 2 terminal hydroxyl groups. These semiesters have the following molecular structure:

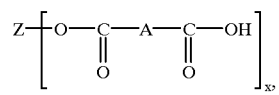

wherein Z is the radical of a polyester polyol or polylactone polyol of formula $Z(OH)_x$ without its terminal hydroxyl groups, A is the radical of a 1,2-dicarboxylic acid of formula $A(COOH)_2$ freed of its 1,2-terminal carboxyl groups, with which, or with its ester-forming derivatives, the polyol was reacted, and x is an integer of at least 2. The upper limit for x is preferably 4. x is very particularly preferably 2 or 3. Semiesters based on succinic acid and, in particular on cycloaliphatic carboxylic acids, especially on hexahydrophthalic acid or hexahydrotrimellitic acid, are particularly suitable as acid component.

Polyester polyols suitable for the preparation of the carboxyl-terminated polyesters can be, for example, reaction products of polyfunctional carboxylic acids, in particular of cycloaliphatic or aliphatic carboxylic acids, such as hexahydroisophthalic acid, hexahydroterephthalic acid, hexahydrophthalic acid, succinic acid, glutaric acid, adipic acid, pimelic acid, suberic acid, azelaic acid, sebacic acid, with an excess of aliphatic polyols, in particular di- and triols, such as ethylene glycol, propylene glycol, 1,3-butanediol, 1,4-butanediol, neopentanediol, isopentane glycol, 1,6 hexanediol, 1,7-heptanediol, 1,8-octanediol, glycerol, trimethylolethane, trimethylolpropane or cyclohexanediol. It is preferred to use linear aliphatic dicarboxylic acids as well as linear aliphatic diols, each containing 5 to 8 methylene groups in the aliphatic chain. Polyesters of this kind are also commercially available, for example under the trademark K-Flex® 188 and 148, of King Industries.

For the preparation of the carboxyl-terminated polyesters for the novel compositions, the polyols $Z(OH)_x$ may advantageously also be certain polylactone polyols, namely compounds of formula:

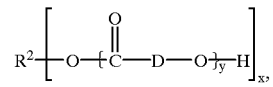

wherein $R^2$ is the radical of an x-valent cyclic or acyclic polyol $R^2(OH)_x$ without its hydroxyl groups, which is used as initiator for the lactone polymerisation, x has one of the meanings mentioned above for x; y is 1 or an integer higher than 1, preferably an integer from 1 to 20, more preferably from 1 to 10, and D corresponds to an alkylene group of the structure

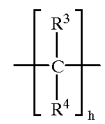

having a total of at most 12 carbon atoms, wherein $R^3$ and $R^4$ are each independently of the other a hydrogen atom or a $C_1$–$C_3$alkyl radical and h is an integer from 5 to 8. Polylactones of the cited kind are known and are described, inter alia, in GB-A-2 160 534, the contents of which are to be regarded as part of this description. Particularly preferably, h is 5 and $R^3$ and $R^4$ are both a hydrogen atom. Such polycaprolactones are also commercially available under the tradename CAPA ®, of Interox Chemicals Ltd.

The carboxyl-terminated polyesters which are most preferred are the semiesters of hydroxyl-terminated polycaprolactones and cis-hexahydrophthalic acid anhydride.

The novel compositions furthermore comprise a catalyst for accelerating the thermal reaction of (2-oxo-1,3-dioxolan-4-yl)methyl groups and carboxyl groups, making a sufficiently fast curing reaction at temperatures from 100° C. possible. The catalyst is usually an organic amine or a derivative of an amine, in particular a tertiary amine or a nitrogen-containing heterocyclic compound. The preferred catalyst is 1,8-diazabicyclo[5,4,0]-7-undecene. Other very suitable catalyst compounds are also onium salts, for example tributylammonium bromide or ethylenetriphenylphosphonium bromide. The catalyst or a catalyst mixture is conveniently added in an amount of about 3 to 10, preferably of 3 to 6, percent by weight.

Typical examples of suitable inert solvents are xylenes, butyl acetate, isobutanol, 1-methoxy-2-propanol, 1-methoxy-2-propylacetate, γ-butyrolactone and methyl isobutyl ketone (MIBK). It is particularly preferred to use a solvent mixture of 1-methoxy-2-propanol, 1-methoxy-2-propylacetate and MIBK, preferably at a weight ratio of about 70 to 20 to 10. The novel compositions can be prepared using a relatively small amount of inert solvent and they therefore preferably have a high solids content, for example in the range of 40 to 70 percent by weight.

In addition to the cited components, the novel compositions can comprise additional standard components for lacquers, e.g. pigments, brighteners, light stabilisers, antioxidants, flow control agents, adhesives, thixotropic agents, reactive diluents, e.g. based on liquid anhydrides, such as alkylhexahydrophthalic acid anhydride, preferably methylhexahydrophthalic acid anhydride, etc.

The novel compositions have excellent storage-stability. The viscosity of the compositions, for example, usually changes neither during a ten-day storage at 60° C. nor during a one-week storage at 80° C.

The novel compositions can be used, for example, as coatings, as casting resin, impregnating resin, laminating resin, adhesive or sealing material. Because of their good storage stability they are particularly suitable for use in one-component form. The novel compositions are particularly preferably used as automotive lacquer, where they can be used, for example, as primer or, filled with pigments and/or colourants, as chromophoric base coat and also, unpigmented, as clear top coat. Compositions of this invention are suitable, for example, for the first coating of the automobiles at the producer's (Original Equipment Manufacturing), convenient stoving temperatures being from about 100 to 200° C.

This invention therefore also relates to a process for coating objects, in particular automotive parts, which comprises coating the object with a novel composition and then drying the coating and curing it at a temperature in the range from 100 to 200° C., preferably from 120 to 180° C.

Unless otherwise stated in the Examples, percentages are by weight. In the Examples, identical footnotes have identical meanings for all Examples, unless otherwise stated.

EXAMPLE 1

Preparation of a copolymer based on methacrylate monomers (methacrylate component 1)

| | parts by weight [g] |
|---|---|
| Monomer charge: | |
| methacrylic acid (MM) | 30 |
| styrene (St) | 20 |
| methyl methacrylate (MMA) | 30 |
| butyl methacrylate (BuMA) | 120 |
| dicumyl peroxide (initiator) | 3.0 |
| thioglycolic acid (chain transfer agent) | 3.5 |

-continued

| | parts by weight [g] |
|---|---|
| reactor charge: | |
| toluene | 60 milliliter |
| dicumyl peroxide (initiator) | 3.0 g |
| thioglycolic acid (chain transfer agent) | 3.5 g |

The mixture serving as monomer charge is washed with a 4% sodium hydroxide solution and with a 20% sodium chloride solution and is then dried over anhydrous sodium sulfate.

The reactor charge is placed in a reaction vessel equipped with mechanical stirrer, nitrogen inlet, condenser, heating, thermometer and a metering pump for the continuous addition of the monomer charge. While being flushed with nitrogen, the temperature of the reactor charge is raised to 110° C. so that the toluene refluxes. The monomer charge is then added to the reactor charge in the reaction vessel over a period of 3 hours, the viscosity of the mixture in the reaction vessel increasing very much towards the end of the addition. After heating the mixture for about another six hours to 110° C., it is cooled to room temperature. The toluene is removed by evaporation and the remaining copolymer is dissolved in ether, precipitated with hexane, isolated by filtration and dried.

The copolymer so obtained has a molecular weight ($M_w$) of 10330 (determined by GPC using a polystyrene standard; $M_w/M_n$=4.7), a glass transition temperature ($T_g$-Wert) of 45.8° C. and contains 1.98 equivalents of free carboxyl groups per kilogram of copolymer.

EXAMPLE 2

Preparation of a halfester from a polycaprolactone polyol and hexahydrophthalic acid anhydride 100 g of hexahydrophthalic acid anhydride are placed together with 1.6 g of tetramethylammonium chloride in a reaction vessel equipped with mechanical stirrer, nitrogen inlet and thermometer and are heated under nitrogen to 135° C. 59.97 g of CAPA® 316 (polycaprolactone polyol, of Interox Chemicals Ltd., having a molecular weight of 1,000 and 3.89 equivalents of hydroxyl groups per kilogram of substance) are added dropwise over 2 hours. The reaction product obtained after cooling is a viscous liquid having a viscosity of 40,500 mPa.s (at 67° C.), a $T_g$ value of −19° C. and 2.61 equivalents of free carboxyl groups per kilogram of substance.

EXAMPLE 3

Preparation of hexahydrophthalic acid bis(2-oxo-1,3-dioxolan-4-yl)methyl ester 1 mol of cis-hexahydrophthalic acid diglycidyl ester (6.6 equ. epoxide/kg) and 0.05 mol of sodium iodide are added to 500 ml of N,N-dimethylformamide. A stream of $CO_2$ gas is passed through this mixture at 100° C. for 8 hours. The mixture then turns slightly yellow. Half of the solvent is then removed at 130° C. on a rotary evaporator. The remaining reaction mixture is washed with water, dried over sodium sulfate and filtered. The remaining solvent is then removed again at 130° C. on a rotary evaporator. The resultant product is a highly viscous yellow liquid. A titrimetric determination shows it to contain 0.03 equ./kg of unreacted epoxy groups.

EXAMPLE 4

A clear varnish solution is prepared by mixing the following components using little shear strength:

| components | amount [g] |
|---|---|
| methacrylate component of Example 1 | 6.500 |
| halfester of Example 2 | 3.500 |
| hexahydrophthalic acid bis(2-oxo-1,3-dioxolan-4-yl) methyl ester | 4.145 |
| 1,8-diazabicyclo[5,4,0]-7-undecene (catalyst) | 0.753 |
| solvent LMG XI | 13.150 |
| UV absorber (Tinuvin ® 400) | 0.280 |
| antioxidant (Tinuvin ® 123) | 0.146 |
| flow control agent (Byk ® 300) | 0.050 |

The solids content of the varnish solution is 55 percent by weight, the viscosity according to Höppler is 300 mPa.s at 25° C. The clear varnish is applied to an aluminium substrate at a layer thickness of 35 μm. After curing the varnish under the conditions indicated in Table 1, it has the properties also given in that Table:

TABLE 1

| | | | |
|---|---|---|---|
| cure [temperature in ° C./time in min] | 160/45 | 150/60 | 140/75 |
| Erichsen deep drawing test (DIN 53156) [mm] | 10.0 | 10.0 | 10.0 |
| impact strength R (Al/Al) [kg · cm][4] | 160 | 160 | 80 |
| hardness (acc. to Persoz) [s] | 192 | 182 | 192 |
| acetone test[5] | 3 | 3 | 3 |

[4] The impact strength is determined by letting a die of known mass drop from a specific height onto the coated substrate. The indicated value is the product of the mass of the die in kg and of the highest height in cm at which the coating remains undamaged, i.e. at which no cracks can be found at 10-fold enlargement. The addition "R" means that the die meets the substrate on the side not facing the coating.
[5] The acetone test is carried out as follows as a friction test: A cottonwool swab is drenched with acetone and rubbed twenty times back and forth on one part of the coating. The result is assessed according to the following scale of five (DIN 53320); 0 = no change; 1 = slowing down, cannot be scratched with a finger nail; 2 = difficult to scratch, cottonwool may be coloured; 3 = softened, can easily be scratched; 4 = starting to peel or dissolve; 5 = complete dissolution.

EXAMPLE 5

A clear varnish solution is prepared by mixing the following components using little shear strength:

| components | amount [g] |
|---|---|
| methacrylate component of Example 1 | 13.000 |
| halfester of Example 2 | 7.000 |
| hexahydrophthalic acid bis(2-oxo-1,3-dioxolan-4-yl)methyl ester of Example 3 | 6.134 |
| cis-hexahydrophthalic acid diglycidyl ester (6.6 equ. epoxide/kg) | 1.666 |
| 1,8-diazabicyclo[5,4,0]-7-undecene (catalyst) | 1.390 |
| solvent LMG XI | 21.000 |
| UV absorber (Tinuvin ® 400) | 0.556 |
| antioxidant (Tinuvin ® 123) | 0.278 |
| flow control agent (Byk ® 300) | 0.098 |

In this composition, hexahydrophthalic acid bis(2-oxo-1,3-dioxolan-4-yl)methyl ester and cishexahydrophthalic acid diglycidyl ester are at a ratio of 75 to 25, based on the (2-oxo-1,3-dioxolan-4-yl)methyl groups and the epoxy groups.

The solids content of the varnish solution is 59.3% percent by weight, the viscosity according to Höppler is 535 mPa.s at 25° C. The clear varnish is applied to an aluminium substrate at a layer thickness of 30 μm. After curing the varnish under the conditions indicated in Table 2, it has the properties also given in that Table:

TABLE 2

| | | | |
|---|---|---|---|
| cure [temperature in ° C./time in min] | 160/30 | 150/30 | 140/60 |
| Erichsen deep draw test (DIN 53156) [mm] | 10.0 | 10.0 | 10.0 |
| impact strength R (Al/Al) [kg · cm][4] | 160 | 160 | 160 |
| hardness (acc. to Persoz) [s] | 216 | 221 | 218 |
| acetone test[5] | 3 | 3 | 3 |

EXAMPLE 6

Preparation of a crosslinker having the formula:

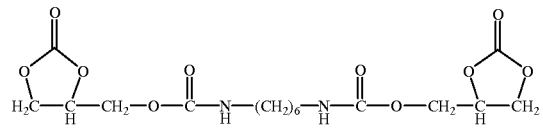

30 g (0.254 mole) Glycerine cyclocarbonate (manufactured according to U.S. Pat. No. 2,915,529 are heated in a reaction vessel together with 21.37 g (0.127 mol) hexamethylene diisocyanat to a temperature of c. 82° C. The mixture is left at that temperature for 15 minutes and a viscous product is obtained which has a molecular weight of 404 and a purity of 72% (as determined by HPLC measurement).

EXAMPLE 7

A clear varnish solution is prepared by mixing the following components using little shear strength:

| components | amount [g] |
|---|---|
| methacrylate component of Example 1 | 6.500 |
| halfester of Example 2 | 3.500 |
| crosslinker according to Example 6 | 4.450 |
| 1,8-diazabicyclo[5,4,0]-7-undecene (catalyst) | 0.723 |
| solvent LMG XI | 8.500 |
| solvent γ-butyrolactone | 4.450 |
| UV absorber (Tinuvin ® 400) | 0.289 |
| antioxidant (Tinuvin ® 123) | 0.145 |
| flow control agent (Byk ® 300) | 0.031 |

The solids content of the varnish solution is 48.5 (in theory 54.7) percent by weight. The clear varnish is applied warm to an aluminium substrate at a layer thickness of 20 μm. After curing the varnish under the conditions indicated in Table 3, it has the properties also given in that Table:

TABLE 3

| | |
|---|---|
| cure [temperature in ° C./time in min] | 160/60 |
| Erichsen deep drawing test (DIN 53156) [mm] | 10.0 |
| impact strength R (Al/Al) [kg · cm][4] | 160 |
| hardness (acc. to Persoz) [s] | 192 |
| acetone test[5] | 3 |

What is claimed is:

1. A curable composition, which comprises the following components:

(A) a polymer component consisting of one or more than one of the following components:
  polymers based on acrylate monomers and/or methacrylate monomers containing free carboxyl groups, and carboxyl-terminated polyesters;
(B) a crosslinker for component (A) selected from the group consisting of:
  (B1) one or more than one compound having a molecular weight of less than 800 and containing at least two (2-oxo-1,3-dioxolan-4-yl)methyl groups per molecule, and
  (B2) a mixture consisting of one or more than one compound having a molecular weight of less than 800 and containing at least two (2-oxo-1,3-dioxolan-4-yl)methyl groups per molecule, and of one or more than one epoxy resin, at least 60 percent of the total number of (2-oxo-1,3-dioxolan-4-yl)methyl groups and epoxy groups of the mixture being (2-oxo-1,3-dioxolan-4-yl)methyl groups;
(C) a catalyst for accelerating the crosslinking reaction between the components (A) and (B), and
(D) a solvent for the components (A), (B) and (C);
the molar ratio of free carboxyl groups to the total number of (2-oxo-1,3-dioxolan-4-yl)methyl groups and epoxy groups in the composition being from 0.3:1 to 3:1.

2. A composition according to claim 1, wherein component (B) comprises (2-oxo-1,3-dioxolan-4-yl)methyl compounds of formula (I):

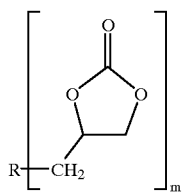

(I)

wherein
  m is 2 or an integer higher than 2, and
  R is a group of formula (II):

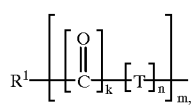

(II)

wherein
  k and
  n are each independently of the other 0 or 1 and wherein
  T in each of the m groups of formula

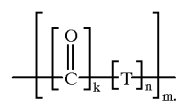

corresponds independently of each other to a group of formula —O—, —NH— or —N<, and
  $R^1$ is an m-valent organic radical having a molecular weight of 28 to 800 minus $m \cdot (101+28 \cdot k+MG_T \cdot n)$, wherein
  $MG_T$ corresponds to the molecular weight of the groups T.

3. A composition according to claim 1, wherein the polymer component (A) is a mixture consisting of:
  (A1) at least one polymer based on acrylate monomers and/or methacrylate monomers and containing an average of 0.1 to 4.0 equivalents of free carboxyl groups per kilogram of polymer, and
  (A2) at least one carboxyl-terminated polyester containing an average of 0.2 to 6 equivalents of free carboxyl groups per kilogram of polyester.

4. A composition according to claim 1, wherein the polymer component (A) comprises a semiester having a molecular weight (average weight Mw) from 500 to 5,000 and a glass transition temperature of less than 30° C. and which has the formula:

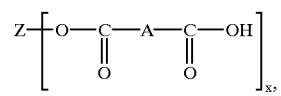

wherein
  Z is the radical of a polyester polyol or polylactone polyol of formula $Z(OH)_x$ without its terminal hydroxyl groups,
  A is the radical of a 1,2-carboxylic acid of formula $A(COOH)_2$ freed of its 1,2-terminal carboxyl groups, and
  x is an integer of at least 2.

5. A composition according to claim 4, wherein A is the radical of a cycloaliphatic 1,2-dicarboxylic acid.

6. A composition according to claim 4, wherein Z is the radical of a polylactone polyol of formula:

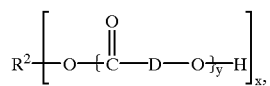

wherein
  $R^2$ is the radical of an x-valent initiator polyol $R^2(OH)_x$ without its hydroxyl groups,
  x has the meaning claimed in claim 4,
  y is 1 or an integer higher than 1, and
  D is an alkylene group of the structure

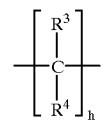

having a total of at most 12 carbon atoms, wherein
  $R^3$ and
  $R^4$ are each independently of the other a hydrogen atom or a $C_1-C_3$ alkyl radical, and
  h is an integer from 5 to 8.

7. A composition according to claim 6, wherein
  h is 5, and
  $R^3$ and
  $R^4$ are both a hydrogen atom.

8. A composition according to claim 6, wherein
  x is 2 or 3.

9. A composition according to claim 1, wherein component (B) consists of one or more than one compound selected from the group consisting of:

(2-oxo-1,3-dioxolan-4-yl)methyl esters of aliphatic dicarboxylic acids containing 4 to 8 carbon atoms;

(2-oxo-1,3-dioxolan-4-yl)methyl esters of benzenedi- or benzenetricarboxylic acids;

(2-oxo-1,3-dioxolan-4-yl)methyl esters of cyclohexanedi- and cyclohexanetricarboxylic acids;

1,4-bis(2-oxo-1,3-dioxolan-4-yloxy)butane;

2,2-bis(2-oxo-1,3-dioxolan-4-yloxymethyl)-1-(2-oxo-1,3-dioxolan-4-yloxy)butane;

1-[2,2-bis(2-oxo-1,3-dioxolan-4-yloxymethyl)butoxy]-2-(hydroxymethyl)-2-(2-oxo-1,3-dioxolan-4-yloxymethyl) butane; and bis{[(2-oxo-1,3-dioxolan-4-yl)methyl]oxymethyl}cyclohexane.

10. A composition according to claim 1, wherein the crosslinkers used for component (A) are exclusively poly[(2-oxo-1,3-dioxolan-4-yl)methyl] compounds.

11. A process for coating objects, in automotive parts, which comprises coating the object with a composition according to claim 1, drying the coating and curing it at a temperature in the range from 100 to 200° C.

* * * * *